(12) United States Patent
Huang

(10) Patent No.: US 8,141,263 B2
(45) Date of Patent: Mar. 27, 2012

(54) APPARATUS FOR MEASURING AN INSIDE DIAMETER OF A HOLE OF A WORKPIECE

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/972,523

(22) Filed: Dec. 20, 2010

(65) Prior Publication Data

US 2011/0271541 A1 Nov. 10, 2011

(30) Foreign Application Priority Data

May 7, 2010 (TW) .............................. 99114716 A

(51) Int. Cl.
*G01B 5/08* (2006.01)
*G01B 7/12* (2006.01)
(52) U.S. Cl. ............ 33/544; 33/542; 33/558.01; 33/783
(58) Field of Classification Search .................... 33/542, 33/543, 544, 546, 550, 551, 552, 555, 555.1, 33/555.3, 558.01, 558.04, 783
See application file for complete search history.

(56) References Cited

U.S. PATENT DOCUMENTS

| 2,573,075 | A | * | 10/1951 | Watson et al. ............... 33/501.4 |
| 4,473,951 | A | * | 10/1984 | Golinelli et al. ............. 33/501.6 |
| 5,115,571 | A | * | 5/1992 | Mackin ....................... 33/558.04 |
| 5,454,175 | A | * | 10/1995 | Li ..................................... 33/542 |
| 6,497,051 | B1 | * | 12/2002 | Poole et al. ................. 33/558.01 |
| 7,137,210 | B2 | * | 11/2006 | Kanai et al. ................... 33/555.1 |
| 2006/0026853 | A1 | * | 2/2006 | Trionfetti ......................... 33/552 |
| 2007/0089315 | A1 | * | 4/2007 | Foege ............................. 33/783 |

* cited by examiner

*Primary Examiner* — G. Bradley Bennett
(74) *Attorney, Agent, or Firm* — Altis Law Group, Inc.

(57) ABSTRACT

An apparatus for measuring an inside diameter of hole of a workpeice comprises a main body, two probing legs, two pressure sensors, a controller unit, a display unit, and a step-motor. The two probing legs have a first end and a two second end. Two pressure sensors are respectively mounted on the second end and configured from generating a pressure signal in response to a reacting force applied thereon by an inner wall in the hole. The step-motor is configured for driving the two probing legs to rotate so as to enable the pressure sensors to about against the inner wall. The controller unit is configured for controlling the step driving the probing legs to rotate in response to the pressure signal and computing a rotation angle of each probing leg. The display unit is configured for display the inside diameter of a the hole.

4 Claims, 3 Drawing Sheets

APPARATUS FOR MEASURING AN INSIDE DIAMETER OF A HOLE OF A WORKPIECE

BACKGROUND

1. Technical Field

The present disclosure relates to an apparatus for measuring an inside diameter of a hole of a workpiece.

2. Description of Related Art

Vernier calipers are normally used for measuring the inside diameter of holes of a workpiece. Measuring probing legs of a vernier caliper are inserted into the hole touching the inside surface of the hole. Thus the value of the inside diameter of the hole can be read from the vernier caliper.

However, it is not uncommon for the measurement obtained using vernier calipers to be smaller than the actual inside diameter of the hole of a workpiece.

BRIEF DESCRIPTION OF THE DRAWINGS

Many aspects of the present apparatus for measuring an inside diameter of a hole of a workpiece can be better understood with reference to the following drawings. The components in the drawings are not necessarily drawn to scale, the emphasis instead being placed upon clearly illustrating the principles of the present apparatus for measuring an inside diameter of a hole of a workpiece. Moreover, in the drawings, like reference numerals designate corresponding parts throughout the several views.

DETAILED DESCRIPTION

Embodiments of the present apparatus for measuring an inside diameter of a hole of a workpiece will now be described in detail below and with reference to the drawings.

Figure 1:
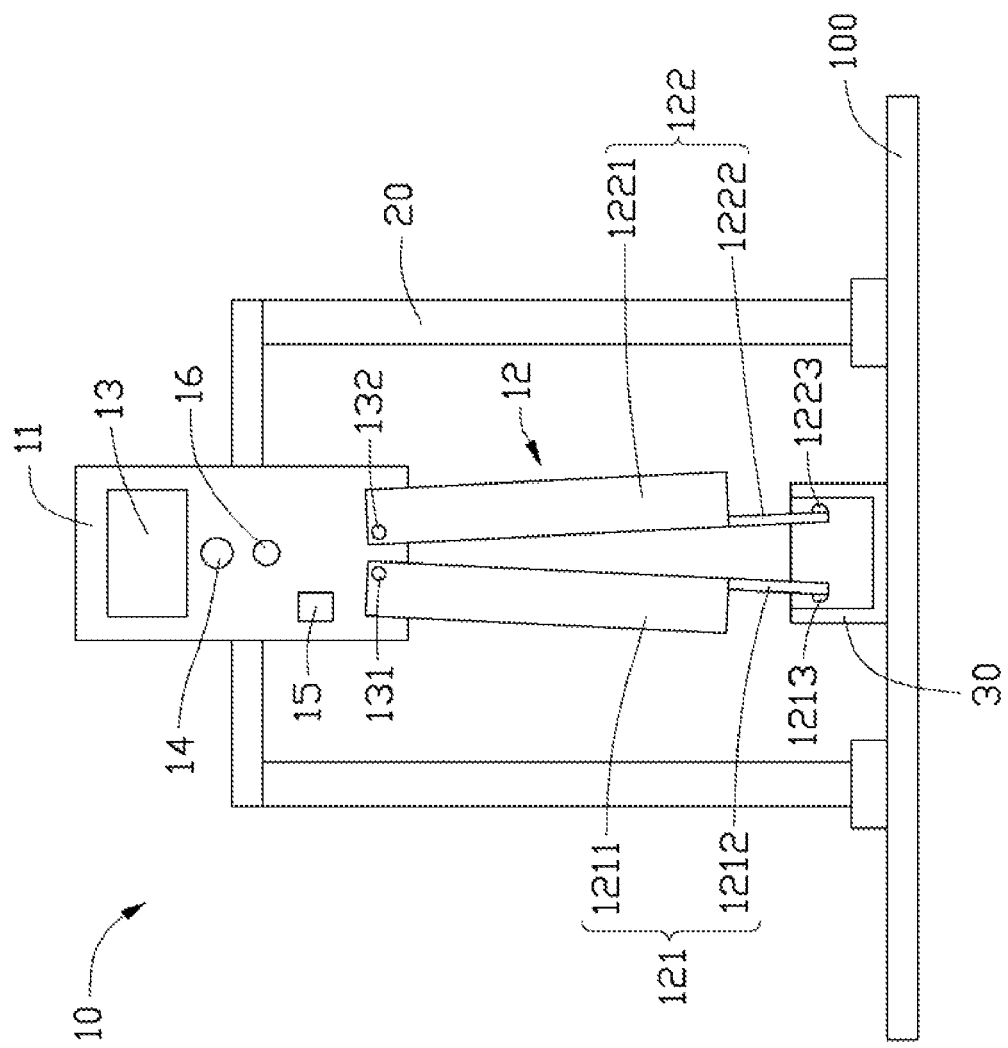
FIG. 1 is a schematic view of an embodiment of an apparatus for measuring an inside diameter of a hole of a workpiece while in the process of measuring a hole.
Figure 2:
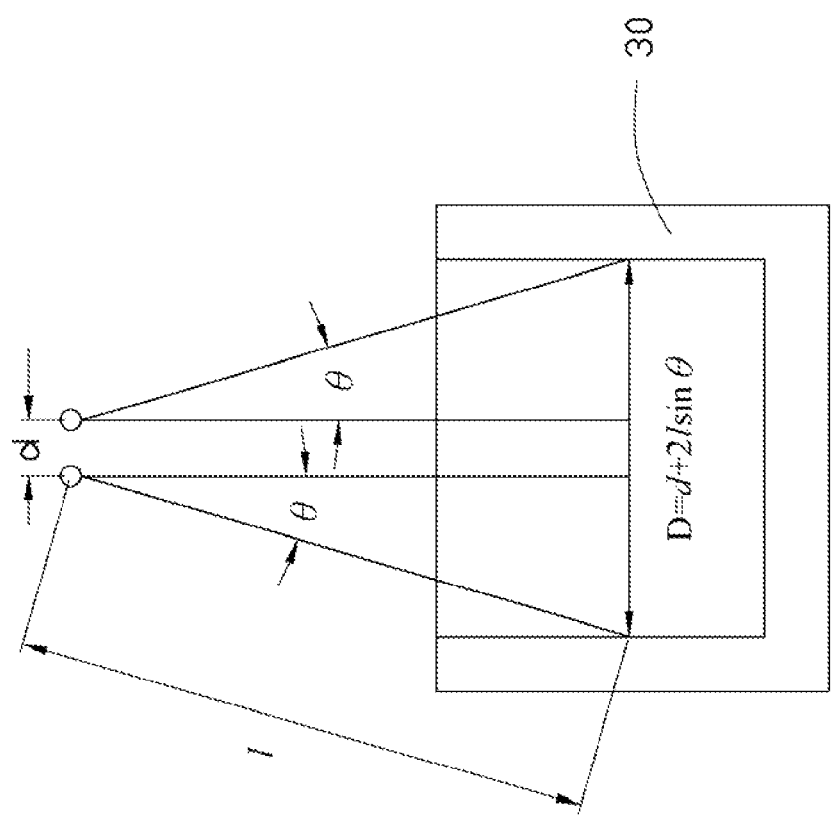
FIG. 2 is similar to FIG. 1, but illustrating mathematical principles involved in taking the measurement of the hole of a workpiece in FIG. 1.

Referring to FIG. 1 and FIG. 2, an apparatus 10 for measuring an inside diameter of a hole of a workpiece includes a main body 11, a probing member 12, a display unit 13, a controller unit 14, a step motor 15, and a reset button 16. During the measurement process, a supporting frame 20 is used for supporting the apparatus 10 and the supporting frame 20 is located on a platform 100.

The probing member 12 is set on o the main body 11. The probing member 12 includes a first probing leg 121 and a second probing leg 122. The first probing leg 121 includes a first main arm 1211 and a first sensor end 1212 located on the first main arm 1211. A first contact portion 1213 is set on the first sensor end 1212. The second probing leg 122 includes a second main arm 1221 and a second sensor end 1222 located on the second main arm 1221. A second contact portion 1223 is set on the second sensor end 1222.

The first probing leg 121 can rotate relative to the main body 11 about a first pivot point 131 on the main body 11. The second probing leg 122 can also rotate relative to the main body 11 about a second pivot point 132 on the main body 11.

The length between the first pivot point 131 and the first contact portion 1213 is l and the length between the second pivot point 132 and the second contact portion 1223 is also l. In other words, the length of the first probing leg 121 is equal to that of the second probing leg 122.

The first contact portion 1213 and the second contact portion 1223 are configured for contacting the inside surface of the hole of a workpiece. The material of the first contact portion 1213 and the second contact portion 1223 includes piezoelectric material.

In an initial position, the first pivot point 131 is substantially parallel with the second pivot point 132, the first probing leg 121 and the second probing leg 122 are aligned substantially perpendicular to the platform 100, and a space between the first pivot point 131 and the second pivot point 132 is d.

When measuring the inside diameter of a hole, the probing member 12 splays so that the first probing leg 121 and the second probing leg 122 splay in the to-be-measured hole 30. When the first probing leg 121 and the second probing leg 122 splay, the first probing leg 121 slants at an angle θ relative the first pivot point 131 and the second probing leg 122 slants at an angle θ relative to the second pivot point 132.

The step motor 15 drives the first pivot point 131 and the second pivot point 132, so that the first probing leg 121 and the second probing leg 122 can rotate simultaneously and the distance between the first contact portion 1213 and the second contact portion 1223 is changed.

When the first contact portion 1213 and the second contact portion 1223 contact the inside surface of the to-be-measured hole 30, pressure of the contacts cause a signal to be sent to the controller unit 14. The controller unit 14 stops driving the step motor 15 upon receiving the signal and can obtain the number of steps taken by the step motor 15 and calculate the angle θ. The inside diameter D of the to-be-measured hole 30 can be calculated as: D=d+2l sin θ. In this embodiment, the controller unit 14 computes the inside diameter D.

The display unit 13 is configured for displaying the inside diameter received from the controller unit 14.

The display unit 13 can be, for example, a liquid crystal display or a lighting-emitter-diode display.

The reset button 16 is configured for resetting the controller unit 14. The step motor 15 drives the first probing leg 121 and the second probing leg 122 to return to the initial position, in another words, to the point where the angle θ is equal to zero.

Figure 3:
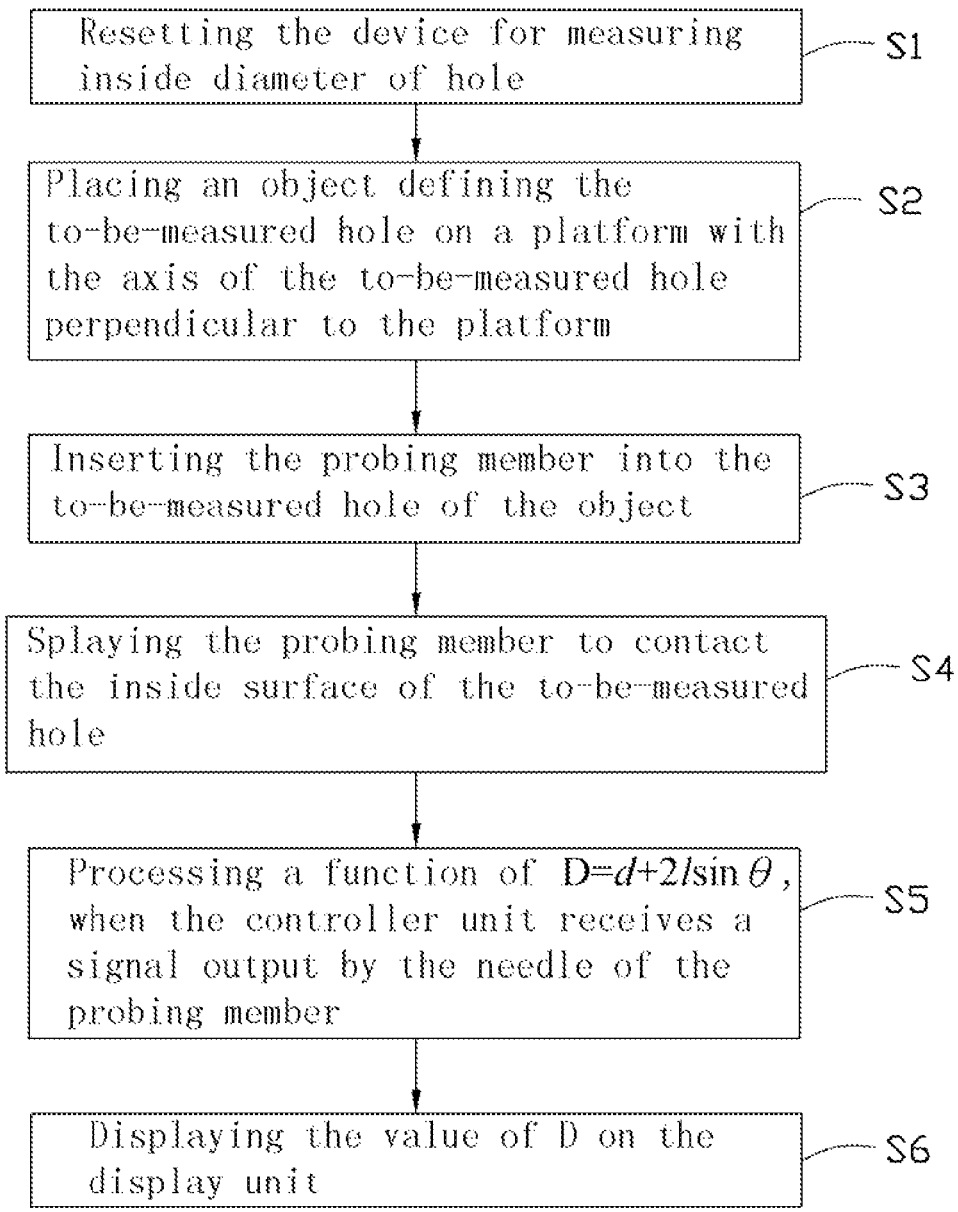
FIG. 3 is a flowchart of a method for measuring an inside diameter of a hole of a workpiece.

A flowchart of a method for measuring an inside diameter of a hole of a workpiece according to the above-mentioned apparatus for measuring an inside diameter of a hole of a workpiece is shown in FIG. 3. The method for measuring the inside diameter of a hole of a workpiece includes the following steps.

Step S1, resetting the apparatus for measuring inside diameter of a hole.

The reset button 16 is pressed, then the result of the display unit 13 is cleared and the first probing leg 121 and the second probing leg 122 are in the initial position.

Step S2, placing an object defining the to-be-measured hole on a platform with the axis of the to-be-measured hole perpendicular to the platform.

The to-be-measured hole 30 of a workpiece is placed on the platform 100.

Step S3, inserting the probing member into the to-be-measured hole of the object.

The supporting frame 20 is put around the to-be-measured hole 30 and the axis of the first probing leg 121 and the second probing leg 122 are parallel with the axis of the to-be-measured hole 30.

Step S4, splaying the probing member to contact the inside surface of the to-be-measured hole.

The controller unit 14 controls the step motor 15 to drive the first probing leg 121 and the second probing leg 122 to splay.

Step S5, processing a function D=d+2l sin θ, when the controller unit receives a signal output by the contact portion of the probing member.

When the first contact portion 1213 and the second contact portion 1223 contact the inside surface, a signal is sent to the controller unit 14. Then the controller unit 14 stops driving the step motor 15 and compute the number of steps taken by the step motor 15, to calculate the angle θ. And then the controller unit 15 computes the inside diameter of the to-be-measured hole 30 using the formula D=d+2l sin θ.

Step S6, displaying the value of D on the display unit.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for measuring an inside diameter of a hole of a workpiece, comprising:
   a main body;
   two probing legs each having a first end and an opposing second end, the first ends pivotedly coupled to the main body at two spaced pivot points respectively;
   two pressure sensors respectively mounted on the second ends, the pressure sensors configured for generating a pressure signal in response to a reacting force applied thereon by an inner wall of the workpiece in the hole;
   a step motor configured for driving the probing legs to rotate about the pivot points so as to enable the pressure sensors to abut against the inner wall;
   a controller unit configured for controlling the step motor to stop driving the probing legs to rotate in response to the pressure signal, the controller unit configured for computing a rotation angle of each probing leg and the inside diameter of the hole according to the rotation angle and a length of each probing leg and a distance between the pivoting points; and
   a display unit configured for displaying the inside diameter of a hole of a workpiece.

2. The apparatus as described in claim 1, wherein the material of the pressure sensor is piezoelectric material.

3. The apparatus as described in claim 2, wherein the first ends are located on the main body by pivot points.

4. The apparatus as described in claim 3, wherein the controller unit is configured for computing the inside diameter according to the following equation D=d+2l sin θ wherein, D is the inside diameter of the hole, d is the distance between the two pivot points, l is the length of the probing leg and is equal to a distance between the pivot point to the corresponding pressure sensor, and the θ is the rotation angle of each probing leg.

* * * * *